(12) United States Patent
Kandir

(10) Patent No.: US 9,559,789 B2
(45) Date of Patent: Jan. 31, 2017

(54) CONTROL DEVICE UPDATE

(71) Applicant: Contec, LLC, Schnectady, NY (US)

(72) Inventor: Huseyin Kandir, Guilderland, NY (US)

(73) Assignee: Contec, LLC, Schenectady, NY (US)

( * ) Notice: Subject to any disclaimer, the term of this patent is extended or adjusted under 35 U.S.C. 154(b) by 63 days.

(21) Appl. No.: 14/190,888

(22) Filed: Feb. 26, 2014

(65) Prior Publication Data

US 2015/0244471 A1 Aug. 27, 2015

(51) Int. Cl.
| | | |
|---|---|---|
| *G10K 11/00* | (2006.01) | |
| *H04B 11/00* | (2006.01) | |
| *G08C 23/02* | (2006.01) | |
| *G08C 19/28* | (2006.01) | |
| *G08C 23/04* | (2006.01) | |

(52) U.S. Cl.
CPC ............ *H04B 11/00* (2013.01); *G08C 19/28* (2013.01); *G08C 23/02* (2013.01); *G08C 23/04* (2013.01); *G08C 2201/20* (2013.01); *G08C 2201/92* (2013.01)

(58) Field of Classification Search
CPC ..... G08C 2201/20; H04B 11/00; H04B 10/70; H01M 2/021; F41G 1/35; G06Q 20/322; G06Q 20/3272; H04W 64/00; G10L 19/018
USPC ...... 340/12.5, 12.52, 13.24, 13.25; 455/41.1, 455/41.2, 420; 367/198; 709/200, 202, 709/217
See application file for complete search history.

(56) References Cited

U.S. PATENT DOCUMENTS

| | | | |
|---|---|---|---|
| 6,204,796 B1* | 3/2001 | Chan | G08C 19/28 340/12.28 |
| 7,383,297 B1* | 6/2008 | Atsmon | H04B 11/00 704/200.1 |
| 8,725,330 B2* | 5/2014 | Failing | B60L 3/00 701/22 |
| 2007/0213082 A1* | 9/2007 | Ryu | G06F 17/30041 455/466 |
| 2008/0165622 A1* | 7/2008 | Liao | H04B 11/00 367/198 |
| 2009/0066534 A1* | 3/2009 | Sivakkolundhu | H04L 12/281 340/4.32 |
| 2009/0111454 A1* | 4/2009 | Jancic | F41G 1/35 455/420 |
| 2013/0203345 A1* | 8/2013 | Fisher | H04B 1/3816 455/41.1 |
| 2013/0238697 A1* | 9/2013 | Mehta | G06Q 50/01 709/204 |
| 2014/0201069 A1* | 7/2014 | Arentz | H04B 11/00 705/39 |
| 2015/0244472 A1* | 8/2015 | Poppe | H04B 11/00 367/135 |

\* cited by examiner

*Primary Examiner* — Mirza Alam
(74) *Attorney, Agent, or Firm* — Sheppard, Mullin, Richter & Hampton LLP

(57) ABSTRACT

A system and method for updating IR signal information remotely for control devices are disclosed.

24 Claims, 10 Drawing Sheets

CONTROL DEVICE UPDATE

TECHNICAL FIELD

The present invention is directed to updating control devices.

BACKGROUND

A universal remote control device includes infra-red code corresponding to the consumer electronic devices that are controlled by the universal remote control device. A set of infra-red signal information is programmed and embedded into the firmware of the universal control device during the manufacture of the universal remote control device. As new consumer devices appear on the market, an existing universal remote control device needs to be updated with the infra-red code corresponding to the new consumer electronic devices. For example, the universal remote control device is updated via a hardware port connection. The logistics associated with such an update is time consuming and inconvenient. FIG. 1 illustrates the logistics associated with the existing technology for updating universal remote control devices. FIG. 1 shows an update cycle (100), a consumer (102) packing her universal remote control device for shipping (104) to arrive at a service center (106) where the universal remote control device is updated and then shipped back (108) to consumer (102). Such an update cycle (100) takes a period (110) of about 4 days. A more convenient method of updating the infra-red information associated with a universal remote control device is needed.

DETAILED DESCRIPTION

Figure 1:
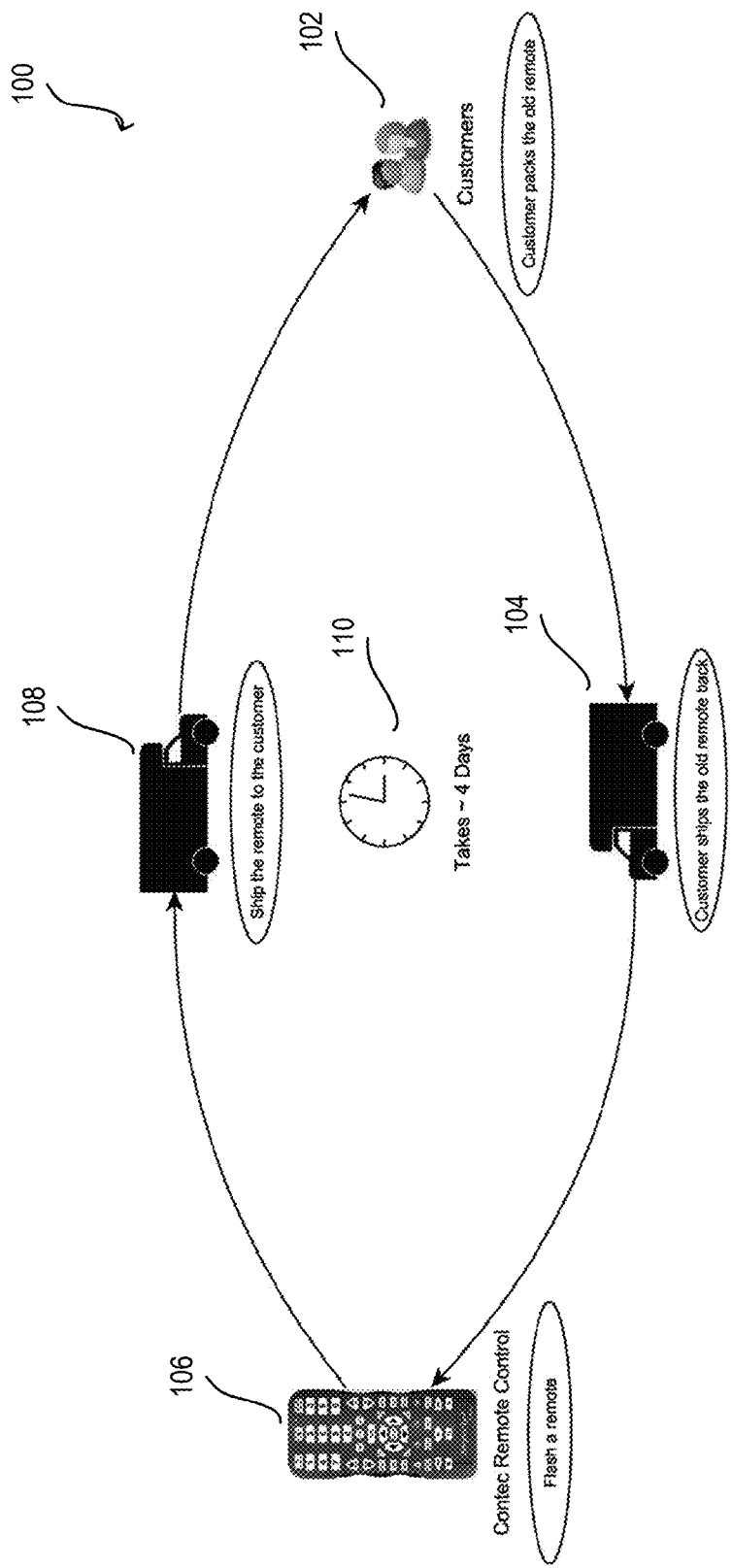
FIG. 1 illustrates the logistics associated with the existing technology for updating universal remote control devices.

Universal remote control devices can be used to control multiple consumer electronic devices. In order to function, universal remote control devices need the infra-red (IR) signal information associated with the particular consumer electronic device that is to be controlled by the universal remote control device. According to certain embodiments, the control code of a universal remote control device can be updated with new IR signal information without requiring the customer to ship her universal remote control device back to the manufacturer or service center for the update.

According to certain embodiments, the methods and systems for updating the control protocol as described herein can be used for updating any given protocol for various types of control devices. As a non-limiting example, some embodiments may apply to radio-frequency (RF) devices.

According to certain embodiments, the control code of a universal remote control device can be updated with updated IR information using sound waves. As non-limiting examples, according to certain embodiments, such sound waves can be transmitted to the universal remote control device through a computer accessing a website, through a mobile phone application, through a customer service wired telephone connection, or through a customer service wireless connection. Using sound waves to update the control codes on the universal remote saves time and expense and provides a better user experience for the consumer.

As a non-limiting example, an IR code library has a total of 71 unique IR protocol numbers and 989 IR data. Such an IR code library can support about 87% of the consumer electronic devices. The remaining 13% of the consumer electronic devices can be supported by transmitting the corresponding IR data to the universal remote control device. According to certain embodiments, the encoding of IR signal information is based on transmitting IR protocol number and button data. Table 1 represents sample IR Data.

TABLE 1

Sample IR Data:

| | | |
|---|---|---|
| 1 | [POWER] | SAA3010 RC-5: 11 1 00000 001100 [00 0C] |
| 2 | [MUTE] | SAA3010 RC-5: 11 0 00000 001101 [00 0D] |
| 3 | [CH ▲] | SAA3010 RC-5: 11 1 00000 100000 [00 20] |
| 4 | [CH ▼] | SAA3010 RC-5: 11 0 00000 100001 [00 21] |
| 5 | [VOL ▲] | SAA3010 RC-5: 11 1 00000 010000 [00 10] |
| 6 | [VOL ▼] | SAA3010 RC-5: 11 0 00000 010001 [00 11] |
| 7 | [0] | SAA3010 RC-5: 11 1 00000 000000 [00 00] |
| 8 | [1] | SAA3010 RC-5: 11 0 00000 000001 [00 01] |
| 9 | [2] | SAA3010 RC-5: 11 1 00000 000010 [00 02] |
| 10 | [3] | SAA3010 RC-5: 11 0 00000 000011 [00 03] |
| 11 | [4] | SAA3010 RC-5: 11 1 00000 000100 [00 04] |
| 12 | [5] | SAA3010 RC-5: 11 0 00000 000101 [00 05] |
| 13 | [6] | SAA3010 RC-5: 11 1 00000 000110 [00 06] |
| 14 | [7] | SAA3010 RC-5: 11 0 00000 000111 [00 07] |
| 15 | [8] | SAA3010 RC-5: 11 1 00000 001000 [00 08] |
| 16 | [9] | SAA3010 RC-5: 11 0 00000 001001 [00 09] |
| 17 | [OK] | SAA3010 RC-5: 10 1 00000 010111 [00 17] |
| 18 | [Input] | SAA3010 RC-5: 11 0 00000 111000 [00 38] |
| 19 | [LAST] | SAA3010 RC-5: 11 1 00000 100010 [00 22] |

With reference to Table 1 above, for an example IR protocol number 0x01 (SAA3010RC-5), the encoded IR signal in hex values is: 01000D2021101-1000102030405060708091773822 and is a total of 160 bits.

According to certain embodiments, the conversion of IR data to sound waves is based on bit values of the encoded IR signal. During the conversion of IR data to sound waves, every bit having a value of 1 is converted to a 2 kHz sine wave, and every bit having a value 0 is converted to a 2.5 kHz sine wave, according to certain embodiments.

According to certain embodiments, modulation of the sound wave signal can be implemented in computer software or hardware or a combination thereof and includes converting the encoded IR signal to sound waves. For example, one or more software modules can receive the encoded IR signal through a user interface or through a data file. The software can then convert the received encoded IR signals to 2 kHz and 2.5 kHz sound waves depending on the bit value. The software can then transmit the sound wave information to the sound card of the computer. Such a procedure is a combination of magnitude modulation and frequency modulation. The use of computer hardware and software creates inaccuracy in the magnitude and timing of the signal. Such inaccuracies can be mitigated using techniques described herein.

Figure 2:
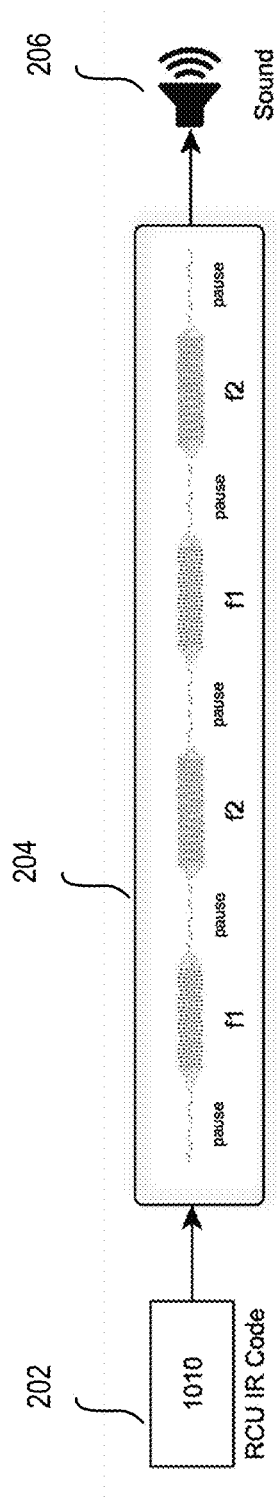
FIG. 2 illustrates a sample modulation of sound waves, according to certain embodiments.

FIG. 2 illustrates a sample modulation of sound waves, according to certain embodiments. FIG. 2 shows IR code (202) associated with a remote control unit, the conversion and modulation (204) of the IR code into f1 and f2 sine waves that are emitted as sound (206).

Once the modulated sound waves (modulated signal) as described herein are generated and recorded, they can be transmitted to the remote control device, according to certain embodiments. FIGS. 3A-3D illustrate some of the different methods of transmitting information to the remote control device in order to update the control code on a remote control device, according to certain embodiments.

Figure 3A:
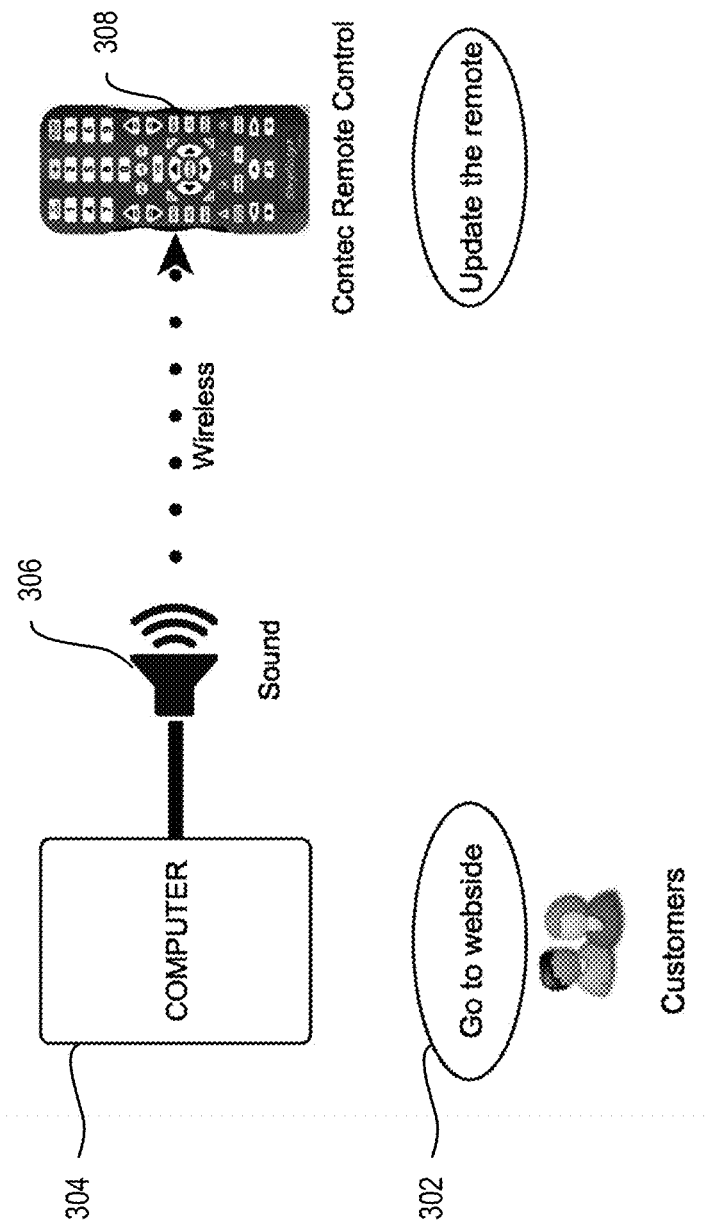
FIG. 3A illustrates a high-level method of transmitting information to the remote control device using a website, according to certain embodiments.

FIG. 3A illustrates a high-level method of transmitting information to the remote control device using a website, according to certain embodiments. FIG. 3A shows that a consumer (302) can use a computer (304) to access a website through which the consumer (302) can activate the computer's speakers (306) to output the modulated signal through the computer's speakers (306) to update the control code of a remote control device (308) by having the remote control device (308) in appropriate proximity to the computer's speakers (306) to receive the modulated signal wirelessly.

Figure 3B:
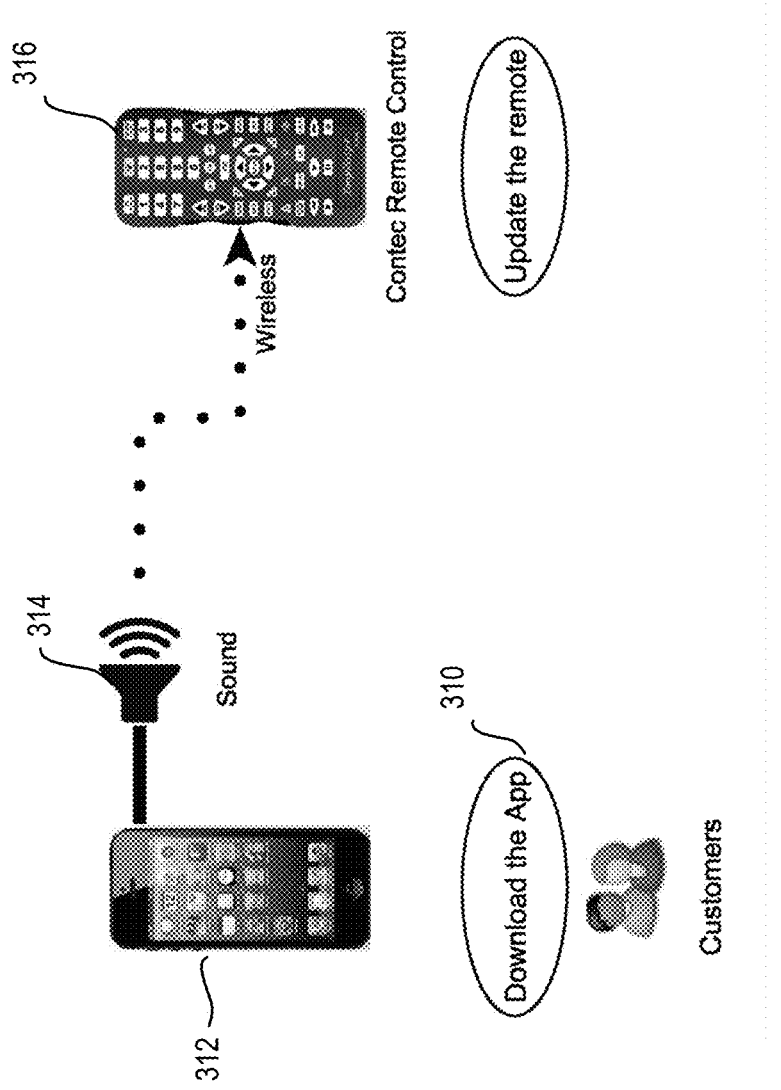
FIG. 3B illustrates a high-level method of transmitting information to the remote control device using a mobile application, according to certain embodiments.

FIG. 3B illustrates a high-level method of transmitting information to the remote control device using a mobile application, according to certain embodiments. FIG. 3B shows that a consumer (310) can use a mobile phone (312) to download a suitable mobile application to the mobile phone (312). The mobile application can be activated to output the modulated signal through the mobile phone's speakers (314) to update the control code of a remote control device (316) by having the remote control device (316) in appropriate proximity to the mobile phone's speakers (314) to receive the modulated signal wirelessly.

Figure 3C:
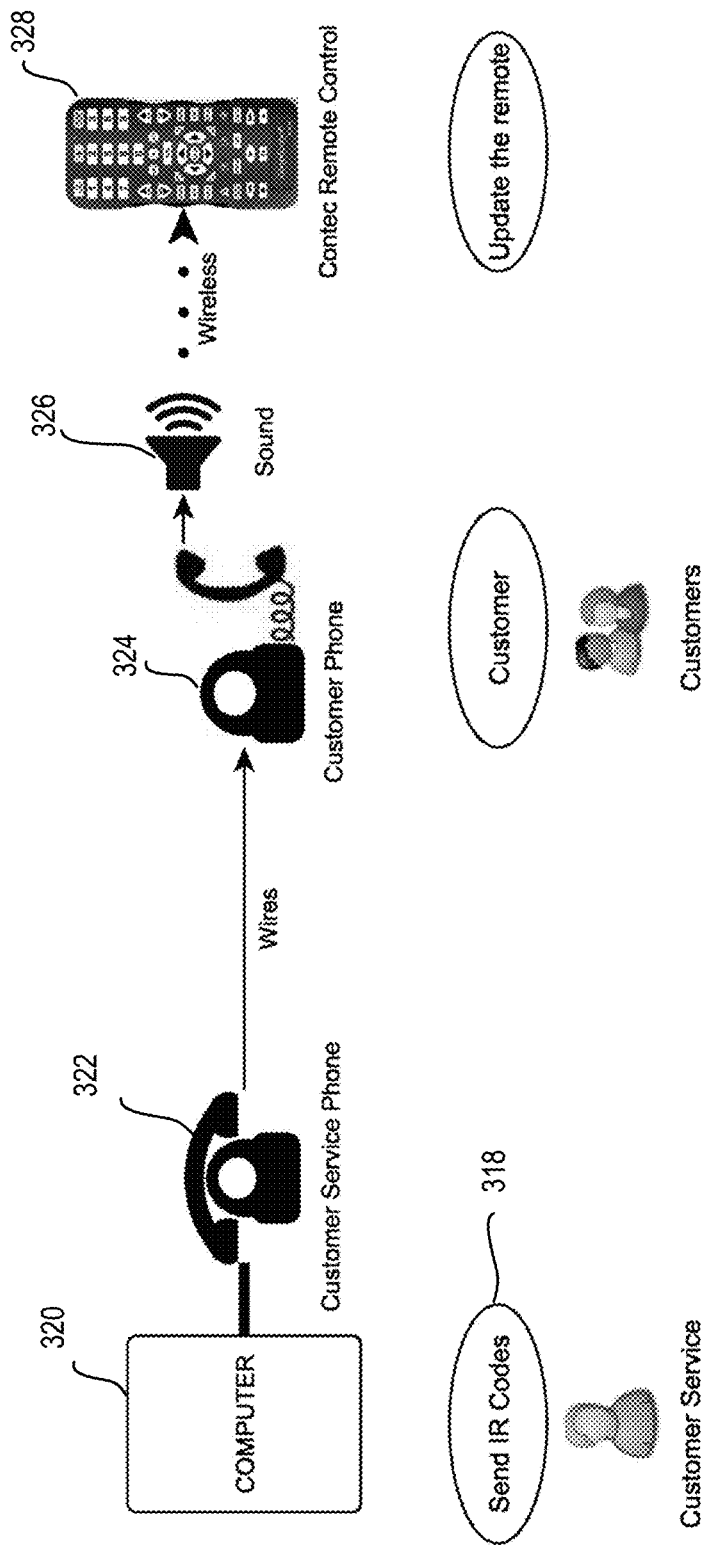
FIG. 3C illustrates a high-level method of transmitting information to the remote control device using a customer service wired phone, according to certain embodiments.

FIG. 3C illustrates a high-level method of transmitting information to the remote control device using a customer service wired transmission, according to certain embodiments. FIG. 3C shows a customer service center (318) that can use a computer (320) to send the modulated signal through a customer service phone (322) to the consumer's phone (324), which in turn can output the modulated signal through the phone's speakers (326) to update the control code of a remote control device (328) by having the remote control device (328) in appropriate proximity to the consumer's phone's speakers (326) to receive the modulated signal wirelessly.

Figure 3D:
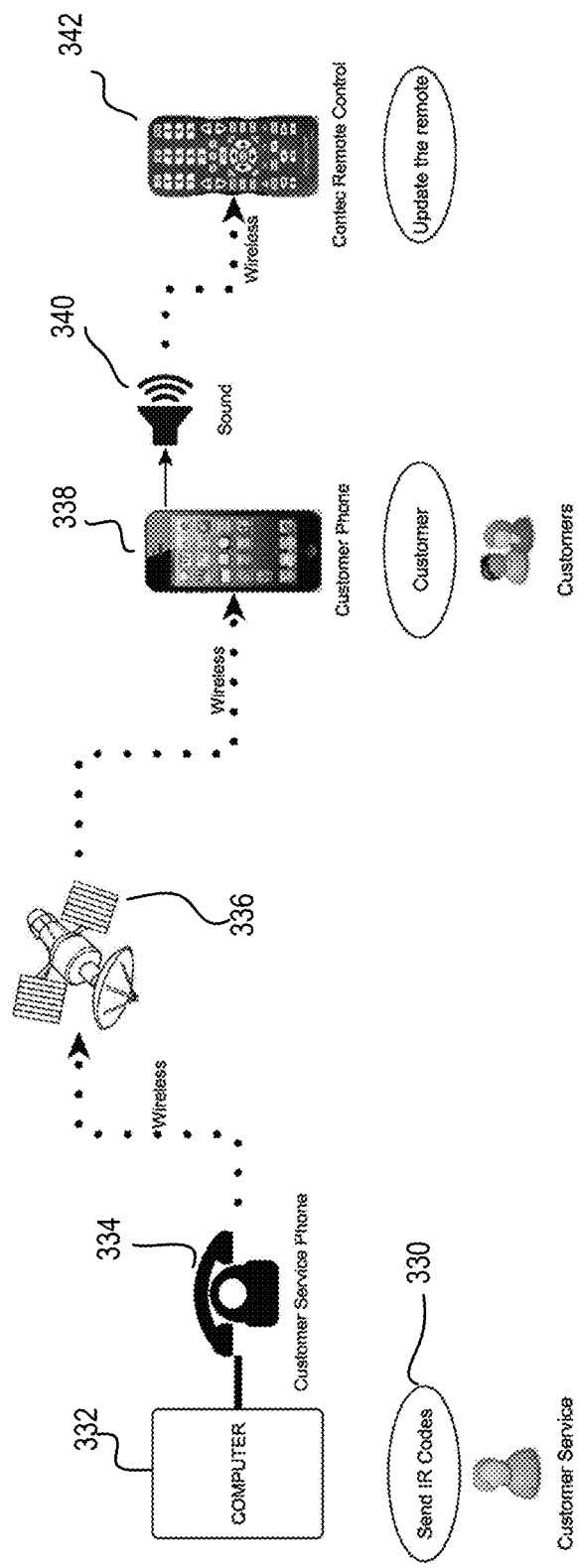
FIG. 3D illustrates a high-level method of transmitting information to the remote control device using a customer service wireless transmission, according to certain embodiments.

FIG. 3D illustrates a high-level method of transmitting information to the remote control device using a customer service wireless transmission, according to certain embodiments. FIG. 3D shows that a customer service center (330) can use a computer (332) and a customer service phone (334) to send a wireless modulated signal to a satellite (336). The satellite (336) can then wirelessly transmit the modulated signal to the consumer's mobile phone (338), which in turn can output the modulated signal through the mobile phone's speakers (340) to update the control code of a remote control device (342) by having the remote control device (342) in appropriate proximity to the consumer's mobile phone's speakers (340) to receive the modulated signal wirelessly.

Figure 4:
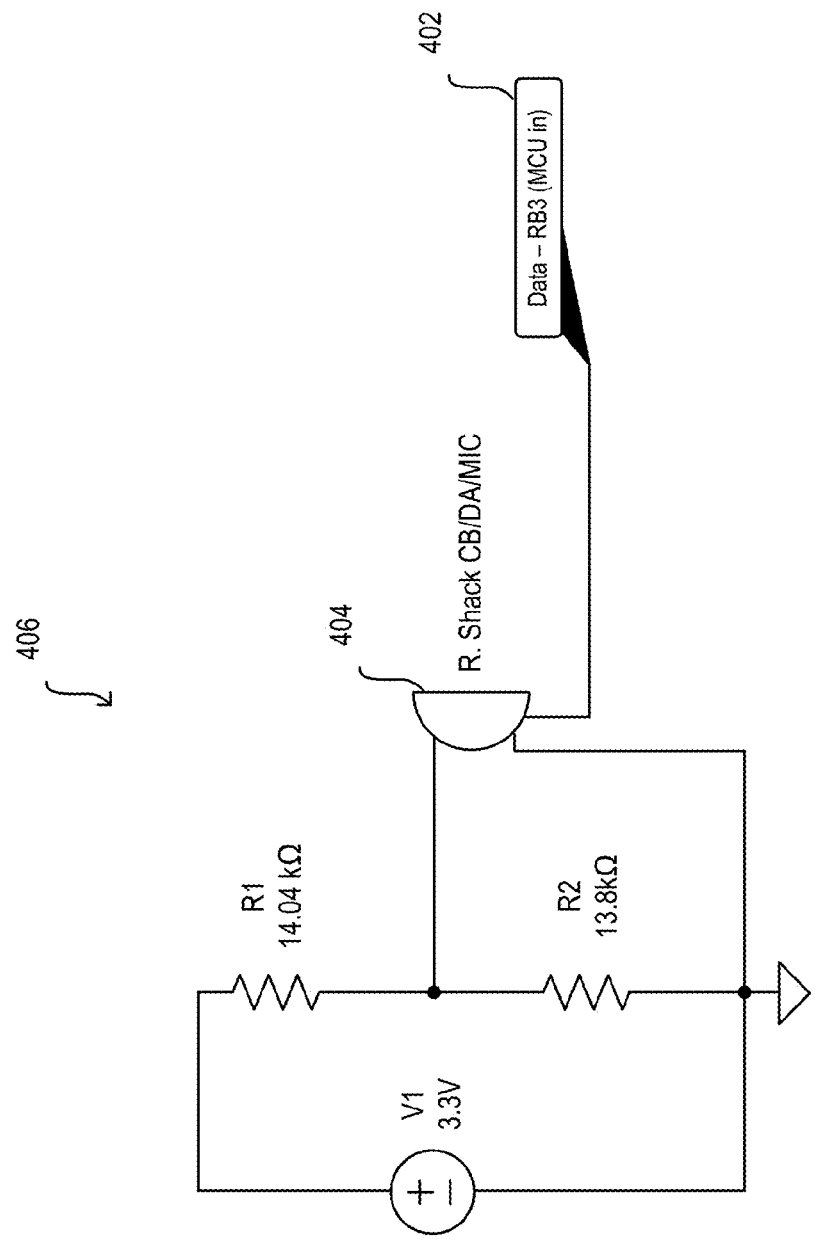
FIG. 4 illustrates the receiver circuitry on a remote control device, according to certain embodiments.

FIG. 4 illustrates the receiver circuitry on a remote control device, according to certain embodiments. The remote control device receives modulated signals (402) via a microphone (404) and a voltage divider circuit (406).

According to certain embodiments, the modulated signal received by the remote control device is demodulated using methods described herein. Most remote control devices are battery operated, thus, the voltage level on the microphone circuit of the remote control device varies with time. To explain, the modulated signal that is received at the microphone of the remote control device is a sine wave and the mean value of the sine wave depends on the battery voltage. According to certain embodiments, the demodulation methods implemented on the firmware of the remote control device is designed to sample about 230 samples from the microphone output before demodulation. A demodulation method implemented on the firmware calculates the mean value of the sine wave and thus can use the mean value to adjust the limits on a demodulation based on the battery power.

The generation of sound on a computer creates a large amount of noise. Further, the transmission of the modulated signal through consumer electronic devices such as cell phones, land line phones, personal computers, sound players, amplifiers, etc., can create additional noise. According to certain embodiments, the firmware on the remote control device can be designed to take advantage of the low bandwidth (see sample IR data from Table 1) modulated signals by taking multiple samples of the signal associated with each received bit. According to certain embodiments, the demodulation method implemented on the firmware calculates the period of the received modulated signal using the previously determined mean value of the sine wave. Based on the period, the demodulation method implemented on the firmware can decide on the value of the received bit based on the following conditions:

If a 2 kHz signal causes a cross on mean value, the period is 500±Error micro second.
If a 2.5 kHz signal causes a cross on mean value, the period is 400±Error micro second.
If the noise causes a cross on mean value, the period is other than above values.
Pause on the signal is received as a noise.

Figure 5:
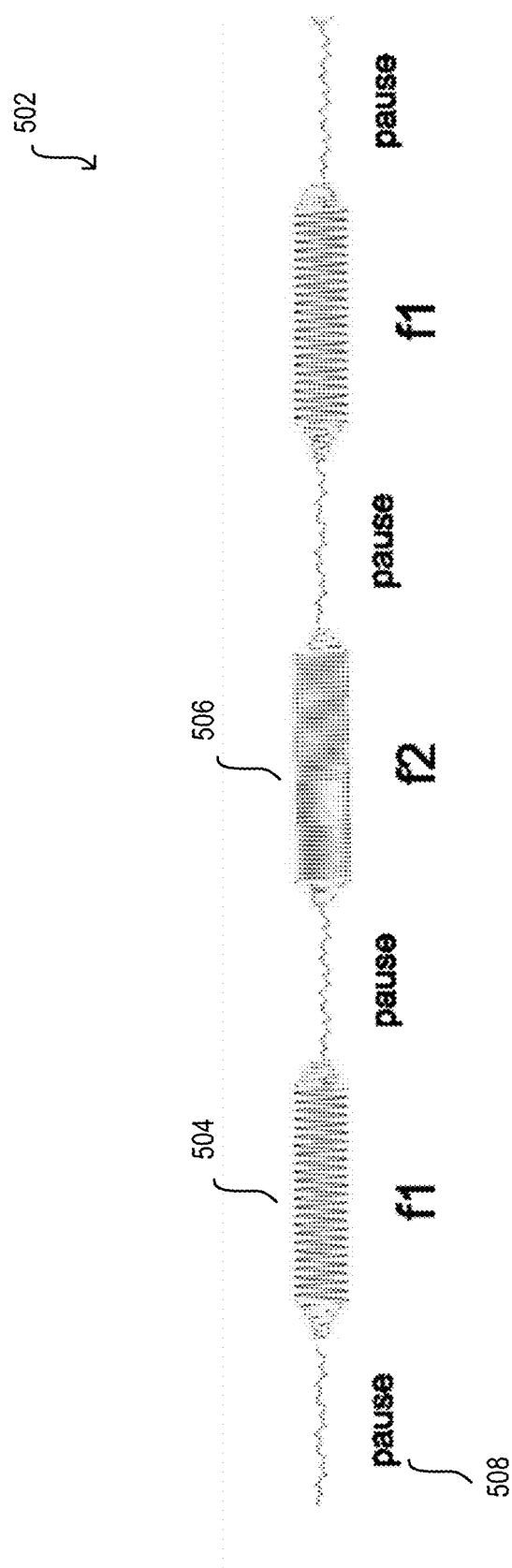
FIG. 5 illustrates a sample modulated noisy signal, according to certain embodiments.

According to certain embodiments, FIG. 5 illustrates a sample modulated noisy signal. FIG. 5 shows a modulated signal (502) with frequencies f1 (504) and f2 (506), and pauses (508).

The demodulation method can be summarized as follows:
Continuously sample the signal and calculate the period.
If the period is 5 times consecutively equal to noise, receive as pause on the signal.
If the period is 5 times consecutively equal to 2 kHz, after receiving a pause, receive as 1.
If the period is 5 times consecutively equal to 2.5 kHz, after receiving a pause, receive as 0.

Figure 6:
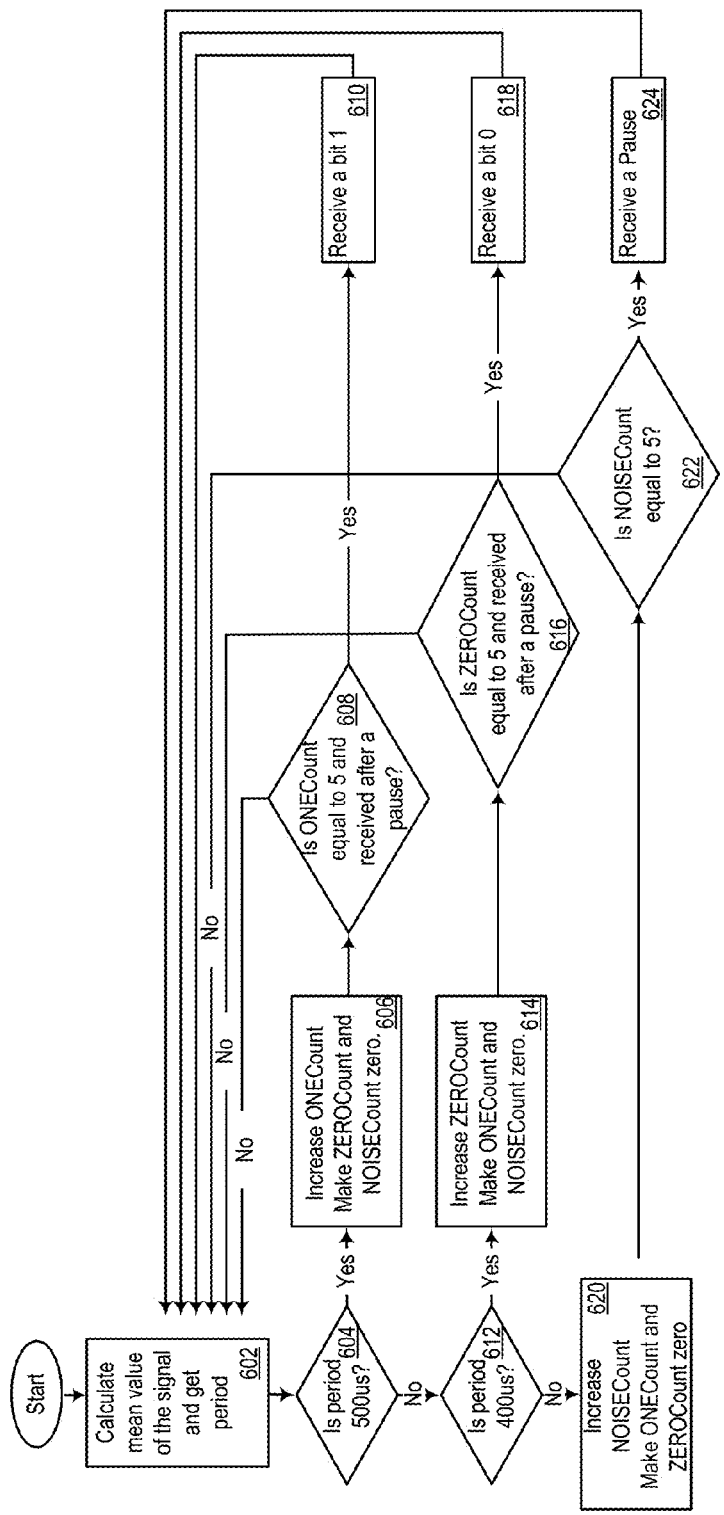
FIG. 6 is a high-level flow chart that summarizes the demodulation procedure, according to certain embodiments.

FIG. 6 is a high-level flow chart that summarizes the demodulation procedure, according to certain embodiments. At block 602, the mean value of the signal is calculated for each signal period calculation from the signal samples. At block 604, it is determined as to whether the period is 500 micro seconds. If the period is 500 micro seconds, then at block 606, increase the value of variable "ONECount" by 1 and set the value of variables "ZEROCount" and "NOISECount" to 0. At block 608, it is determined as to whether the value of ONECount is equal to 5 and after receiving a pause. If it is determined that the value of ONECount is equal to 5 and after receiving a pause then the received signal is determined to be a bit 1 at block 610 and control is returned to block 602. If at block 608, it is determined that the value of ONECount is not equal to 5 and after receiving a pause, then control is returned to block 602.

If it is determined that the period is not 500 micro seconds at block 604, then control passes to block 612 to determine if the period is 400 micro seconds. If the period is 400 micro seconds, then at block 614, increase the value of variable ZEROCount by 1 and set the value of variables ONECount and NOISECount to 0. At block 616, it is determined as to whether the value of ZEROCount is equal to 5 and after receiving a pause. If it is determined that the value of ZEROCount is equal to 5 and after receiving a pause then the received signal is determined to be a bit 0 at block 618 and control is returned to block 602. If at block 616, it is determined that the value of ZEROCount is not equal to 5 and after receiving a pause, then control is returned to block 602.

If it is determined that the period is not 400 micro seconds at block 612, then at block 620, increase the value of variable NOISECount by 1 and set the value of variables ONECount and ZEROCount to 0. At block 622, it is determined if NOISECount is equal to 5. If it is determined that NOISECount is equal to 5, then the received signal is determined to be a pause at block 624 and control is returned to block 602.

Depending on the type of environment where the remote control device is updated, environmental noise may be received at the microphone of the remote control device during the code update. According to certain embodiments, environmental noise can be mitigated by selecting a microphone that has a sensitivity of about 2 inches, as a non-limiting example. Thus any noise sources that are farther than about 2 inches from the microphone have little or no effect on the signal received at the microphone.

Figure 7:
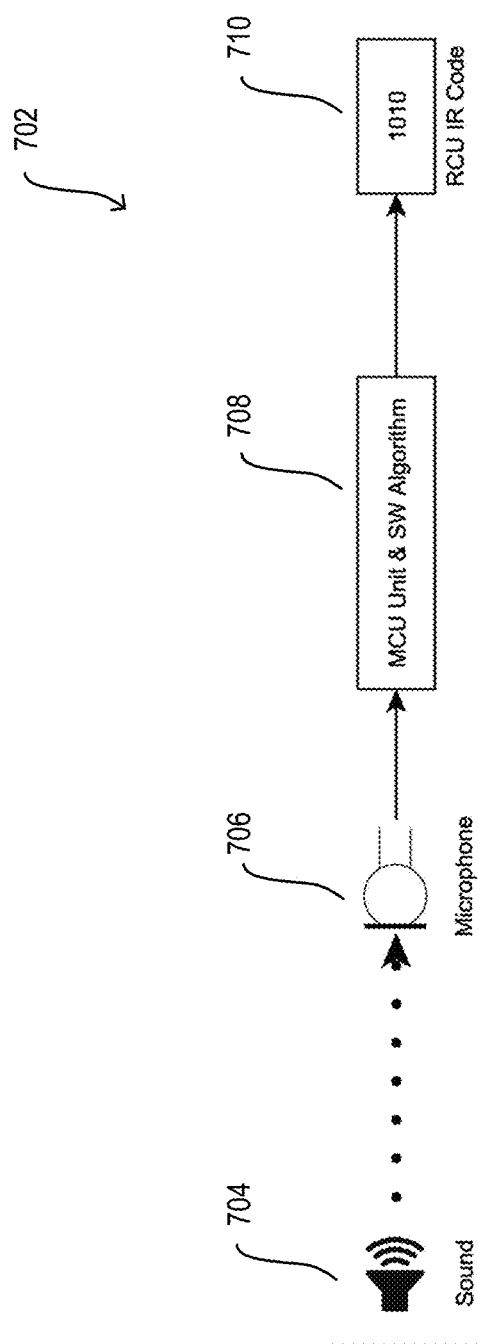
FIG. 7 illustrates a signal receiver and signal demodulation, according to certain embodiments.

Further, operating system of devices that are generating the modulated signal can create inaccuracies in the timing of the modulated signal. According to certain embodiments, the demodulation methods implemented by the firmware on the remote control device can be designed to be independent of signal timing such that timing errors have little or no effect on the receiver of the remote control device. To explain, the timing of any bit or pause can be set during the modulation of a given signal to be independent of the demodulation of the signal. Thus, the transmission of the signal can be controlled to be faster or slower depending on the environment of the remote control device receiver and the transmitter of the electronic devices that are transmitting the modulated signal. FIG. 7 illustrates a signal receiver and signal demodulation (702), according to certain embodiments. FIG. 7 shows the sound or modulated signal (704) received at microphone (706) of the remote control device. FIG. 7 also shows the microcontroller unit (708) on which demodulation techniques are implemented, and the remote control device IR code (710).

According to certain embodiments, the output of the demodulation is filtered such that only ones and zeroes are saved and converted into a binary stream. For example, the binary stream can be reconstructed as shown in Table 2.

TABLE 2

| Decoded IR Data: | |
|---|---|
| 8 bit (IR Protocol Number) | Data bits |
| 01 | 0C0D20211011000102030405060708091 73822 |

The IR protocol information that is stored on the remote control receiver includes the following information:
Number of data bit
Custom bits
Carrier frequency
Bit timing
Number of supported buttons
IR Signal frame information
Toggle bit information Once the remote control device receives an IR protocol number, the firmware of the remote control device will know the above IR protocol information. Thus, only the data bits information is needed, according to certain embodiments.

In the foregoing specification, embodiments of the invention have been described with reference to numerous specific details that may vary from implementation to implementation. The specification and drawings are, accordingly, to be regarded in an illustrative rather than a restrictive sense.

I claim:

1. A system for updating infrared control code information in a remote control device to be used to remotely control an electronic device, the system comprising:
    a data store storing particular infrared control code information for a particular electronic device, the particular infrared control code information for use by a remote control device to control the particular electronic device, the particular infrared control code information including a sequence of 1 and 0 bits;
    at least one signal modulating device for obtaining the particular infrared control code information from the data store and for converting the particular infrared control code information to a sound wave signal, the at least one signal modulating device converting the particular infrared control code information by converting each 1 bit of the infrared control code information to a first sine wave pulse of a first frequency, and each 0 bit of the infrared control code information to a second sine wave pulse of a second frequency different than the first frequency, the at least one signal modulating device generating a pause pulse between each sine wave pulse representing each bit; and
    a communication device for communicating the sound wave signal to the remote control device, which uses the sound wave signal to update the remote control device to control the particular electronic device.

2. The system of claim 1, wherein the at least one signal modulating device performs magnitude modulation and frequency modulation.

3. The system of claim 1, further comprising at least one decoder for performing signal demodulation of the sound wave signal.

4. The system of claim 3, wherein the at least one decoder calculates a mean value of a sine wave pulse associated with the sound wave signal for each period calculation of the sound wave signal.

5. The system of claim 4, wherein the at least one decoder adjusts limits on each demodulation of the sound wave signal based on the calculated mean value and on battery power of the remote control device.

6. The system of claim 3, wherein the at least one decoder calculates a period of the sound wave signal.

7. The system of claim 3, further comprising a microphone that has a sensitivity of about 2 inches.

8. The system of claim 1, wherein the at least one signal modulating device performs modulation on the sound wave signal in a manner that is independent of signal timing during demodulation.

9. The system of claim 3, wherein an output of the signal demodulation is filtered and converted into a binary stream.

10. The system of claim 1, wherein encoded information is infrared information.

11. The system of claim 1, wherein encoded information includes radio-frequency information.

12. A system for updating infrared control code information in a remote control device used to remotely control an electronic device, the system comprising:
   a microphone for receiving a sound wave signal, the sound wave signal including first sine wave pulses of approximately a first frequency, second sine wave pulses of approximately a second frequency different than the first frequency, and pause pulses, each pair of sine wave pulses being separated by one of the pause pulses; and
   at least one signal demodulating device for demodulating the sound wave signal to generate the infrared control code information for use by a particular remote control device to remotely control a particular electronic device, the at least one signal demodulating device demodulating the sound wave signal by converting each first sine wave pulse following one of the pause pulses as a 1 bit and by converting each second sine wave pulse following one of the pause pulses as a 0 bit, the combination of the 0 bits and the 1 bits in the sound wave signal comprising the infrared control code information.

13. The system of claim 12, wherein the at least one signal demodulating device calculates a mean value of a sine wave pulse associated with the sound wave signal.

14. The system of claim 13, wherein the at least one signal demodulating device adjusts limits on each demodulation signal based on the calculated mean value and on a battery power of the remote control device.

15. The system of claim 12, wherein the at least one signal demodulating device calculates a period of the sound wave signal.

16. The system of claim 12, further comprising a microphone that has a sensitivity of about 2 inches.

17. The system of claim 12, wherein the at least one signal demodulating device has a signal timing that is independent of a corresponding modulation signal timing.

18. The system of claim 12, wherein an output of the signal demodulation is filtered and converted into a binary stream.

19. The system of claim 12, wherein encoded information is infrared information.

20. The system of claim 12, wherein encoded information includes radio-frequency information.

21. The system of claim 1, wherein the first sine wave pulse has a first frequency of approximately 2 kHz.

22. The system of claim 1, wherein the second sine wave pulse has a frequency of approximately 2.5 kHz.

23. The system of claim 12, wherein the first sine wave pulse has a first frequency of approximately 2 kHz.

24. The system of claim 12, wherein the second sine wave pulse has a frequency of approximately 2.5 kHz.

* * * * *